US012540895B2

(12) United States Patent
Al-Khaldi et al.

(10) Patent No.: US 12,540,895 B2
(45) Date of Patent: Feb. 3, 2026

(54) LABORATORY APPARATUS FOR IN-SITU MONITORING SPLASH ZONE CORROSION

(71) Applicant: Saudi Arabian Oil Company, Dhahran (SA)

(72) Inventors: Turki Abdullah Al-Khaldi, Dammam (SA); Anas S. Rushaid, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 307 days.

(21) Appl. No.: 18/331,481

(22) Filed: Jun. 8, 2023

(65) Prior Publication Data

US 2024/0410816 A1  Dec. 12, 2024

(51) Int. Cl.
*G01N 17/00* (2006.01)
*G01N 17/04* (2006.01)

(52) U.S. Cl.
CPC ......... *G01N 17/002* (2013.01); *G01N 17/006* (2013.01); *G01N 17/04* (2013.01)

(58) Field of Classification Search
CPC ..... G01N 17/002; G01N 17/006; G01N 17/04
See application file for complete search history.

(56) References Cited

U.S. PATENT DOCUMENTS

| 2018/0216246 | A1 | 8/2018 | Chew et al. | |
| 2018/0274106 | A1 | 9/2018 | Nooren et al. | |
| 2019/0056305 | A1* | 2/2019 | AlJanabi | G01N 17/002 |
| 2019/0257739 | A1* | 8/2019 | Alanazi | G01N 17/02 |

OTHER PUBLICATIONS

Baorong, "Study on corrosion simulation device for marine structural steel," Bulletin of Materials Science, Apr. 2003, 26(3):307-310, 4 pages.
Heyer et al., "EIS study of MIC in three different zones derived from ship ballast tank model system," NACE Corrosion, 2011, 13 pages.
Singh, "Corrosion Control for Offshore Structures," 1st ed., Elsevier, 2014, Chapter 6, 57-88, 32 pages.
Wu et al., "Corrosion Behaviors of Carbon Steels in Artificially Simulated and Accelerated Marine Environment," International Journal of Electrochemical Science, 2017, 12:1216-1231, 16 pages.

* cited by examiner

*Primary Examiner* — Neel D Shah
*Assistant Examiner* — Adam S Clarke
(74) *Attorney, Agent, or Firm* — Fish & Richardson P.C.

(57) ABSTRACT

A computer-implemented method includes: activating a control unit coupled to a chamber in which a lab environment is being created to include at least one splash zone as seen by an offshore oil and gas platform, wherein a lab environment accommodates a mock structure that resembles a construction characteristics of the offshore oil and gas platform; generating, in the lab environment, the at least one splash zone that immerse, at least in part, the mock structure so that varied levels of immersion are created in the splash zone; generating, in the at least one splash zone, waves that impact the mock structure, wherein the generated waves mimic actual waves that impact the offshore oil and gas platform; monitoring, using a set of electrical resistance (ER) probes, a spatial pattern of surface polarization inside the splash zone; and comparing the spatial pattern of surface polarization with a benchmark.

20 Claims, 4 Drawing Sheets

LABORATORY APPARATUS FOR IN-SITU MONITORING SPLASH ZONE CORROSION

TECHNICAL FIELD

This disclosure generally relates to monitoring structural integrity of platforms exposed to seawater corrosion, e.g., splash zone corrosion.

BACKGROUND

Buildings with proximity to saltwater are prone to corrosion, such as splash zone corrosion. The term "splash zone" refers to the area of a structure that is intermittently wetted and dried by waves, tides, or other water movements. Splash zone corrosion is a form of corrosion that occurs in this area and is caused by the interaction between seawater and the metal components of the structure. The continuous exposure to saltwater, along with the mechanical action of waves, causes the formation of a layer of corrosive salts on the surface of the metal, which accelerates the corrosion process. The combination of oxygen and water, together with the presence of salt and other contaminants, can lead to localized corrosion, pitting, and cracking of the metal. Splash zone corrosion is a significant problem for structures such as offshore oil and gas platforms, bridges, piers, and other marine structures that are exposed to harsh environmental conditions.

SUMMARY

In one aspect, some implementations provide a computer-implemented method that includes: activating a control unit coupled to a chamber in which a laboratory environment is being created to include at least one splash zone as seen by an offshore building, wherein a laboratory environment accommodates a mock structure that resembles a construction characteristics of the offshore building; generating, in the laboratory environment, the at least one splash zone that immerses, at least in part, the mock structure when the control unit coordinates a saltwater supply and a water outlet to act in tandem and create varied levels of immersion in the splash zone; generating, in the at least one splash zone, waves that impact the mock structure, wherein the generated waves mimic actual waves that impact the offshore building; monitoring, using a set of electrical resistance (ER) probes, a spatial pattern of surface polarization inside the splash zone when a cathodic protection regime has been applied; and comparing the spatial pattern of surface polarization with a benchmark such that an effectiveness of the cathodic protection regime is determined.

Implementations may include one or more of the following features.

Comparing the spatial pattern of surface polarization with a benchmark may include: comparing the spatial pattern of surface polarization resulting from the cathodic protection regime with a spatial pattern of surface polarization resulting from a different cathodic protection regime. Comparing the spatial pattern of surface polarization with a benchmark may include: comparing the spatial pattern of surface polarization with a pre-determined level. Comparing the spatial pattern of surface polarization with a benchmark may include: comparing the spatial pattern of surface polarization with a spatial pattern of surface polarization resulting from a known combination of tidal conditions and wave conditions. The method may further include: in response to determining that the spatial pattern of surface polarization is not satisfactory, changing at least one parameter in the lab environment, wherein the at least one parameter includes: a parameter for generating the at least one splash zone, a parameter for generating the waves, and a parameter of a cathodic protection regime. The method may further include: measuring, using a potentiostat, a voltage bias associated with the cathodic protection regime. Generating waves that impact the mock structure in the splash zone may include: adjusting, using the control unit, a parameter associated with at least one water jet, wherein the parameter comprises: a speed of exiting fluid, a pressure of exiting fluid, and a flow rate of exiting fluid. Generating the at least one splash zone may include: creating the varied levels of immersion that cyclically includes a high-tide level, a medial tide level, and a low-tide level. The varied levels of immersion may be cyclically created on a daily basis. The method may further include: heating, using a heating coil, saltwater in the chamber; and measuring, using a thermostat, a temperature of saltwater in the chamber.

In another aspect, the implementations provide a computer system including one or more computer processors mounted on a control unit and configured to perform operations of: activating the control unit coupled to a chamber in which a laboratory environment is being created to include at least one splash zone as seen by an offshore building, wherein a laboratory environment accommodates a mock structure that resembles a construction characteristics of the offshore building; generating, in the laboratory environment, the at least one splash zone that immerses, at least in part, the mock structure when the control unit coordinates a saltwater supply and a water outlet to act in tandem and create varied levels of immersion in the splash zone; generating, in the at least one splash zone, waves that impact the mock structure, wherein the generated waves mimic actual waves that impact the offshore building; monitoring, using a set of electrical resistance (ER) probes, a spatial pattern of surface polarization inside the splash zone when a cathodic protection regime has been applied; and comparing the spatial pattern of surface polarization with a benchmark such that an effectiveness of the cathodic protection regime is determined.

Implementations may include one or more of the following features.

Comparing the spatial pattern of surface polarization with a benchmark may include: comparing the spatial pattern of surface polarization resulting from the cathodic protection regime with a spatial pattern of surface polarization resulting from a different cathodic protection regime. Comparing the spatial pattern of surface polarization with a benchmark may include: comparing the spatial pattern of surface polarization with a pre-determined level. Comparing the spatial pattern of surface polarization with a benchmark may include: comparing the spatial pattern of surface polarization with a spatial pattern of surface polarization resulting from a known combination of tidal conditions and wave conditions. The operations may further include: in response to determining that the spatial pattern of surface polarization is not satisfactory, changing at least one parameter in the lab environment, wherein the at least one parameter includes: a parameter for generating the at least one splash zone, a parameter for generating the waves, and a parameter of a cathodic protection regime. The operations may further include: measuring, using a potentiostat, a voltage bias associated with the cathodic protection regime. Generating waves that impact the mock structure in the splash zone may include: adjusting, using the control unit, a parameter associated with at least one water jet, wherein the parameter comprises: a speed of exiting fluid, a pressure of exiting fluid, and a flow rate of exiting fluid. Generating the at least one splash zone may include: creating the varied levels of immersion that cyclically includes a high-tide level, a medial tide level, and a low-tide level. The varied levels of immersion may be cyclically created on a daily basis. The method may further include: heating, using a heating coil, saltwater in the chamber; and measuring, using a thermostat, a temperature of saltwater in the chamber.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented to realize one or more of the following advantages. First, the implementations can allow for studying and monitoring of in-situ offshore corrosion in general and splash zone corrosion in specific in a simulated environment. Second, the implementations can allow for studies of the effectiveness of a cathodic protection regime and the process of metal surface polarization so that corrosion can be mitigated. Third, the implementations can investigate the effectiveness of different corrosion control measures such coatings or corrosion resistance alloys (CRA).

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The splash zone can refer to the zone of, e.g., a manufactured building structure, that is alternately in and out of the water because of, e.g., the influence of tides and wind. The splash zone can include the area between the lowest astronomical tide and the maximum high tide. Splash zone corrosion is a significant problem for structures such as offshore oil and gas platforms, bridges, piers, and other marine structures that are exposed to harsh environmental conditions.

The disclosed technology is directed to system and technology capable of providing a controllable environment to simulate splash zone corrosion with variable parameters that mimic realistic conditions. For example, the disclosed technology can allow in-situ monitoring of the extent of splash zone corrosion so that the corrosion rate can be measured. The disclosed technology can thus enable the production of precise laboratory data in short-term exposure. Furthermore, the implementations can be utilized to study the effectiveness of a protective prevention mechanism (such as special coatings, cathodic protection, and other corrosion control measures) used in mitigation of corrosion under the simulated offshore environment. In addition, the disclosed technology can allow detailed studies regarding the influence of surface polarization on splash zone corrosion in specific and offshore corrosion in general. Details of the implementations are provided below, in association with FIGS. 1-4.

Figure 1:
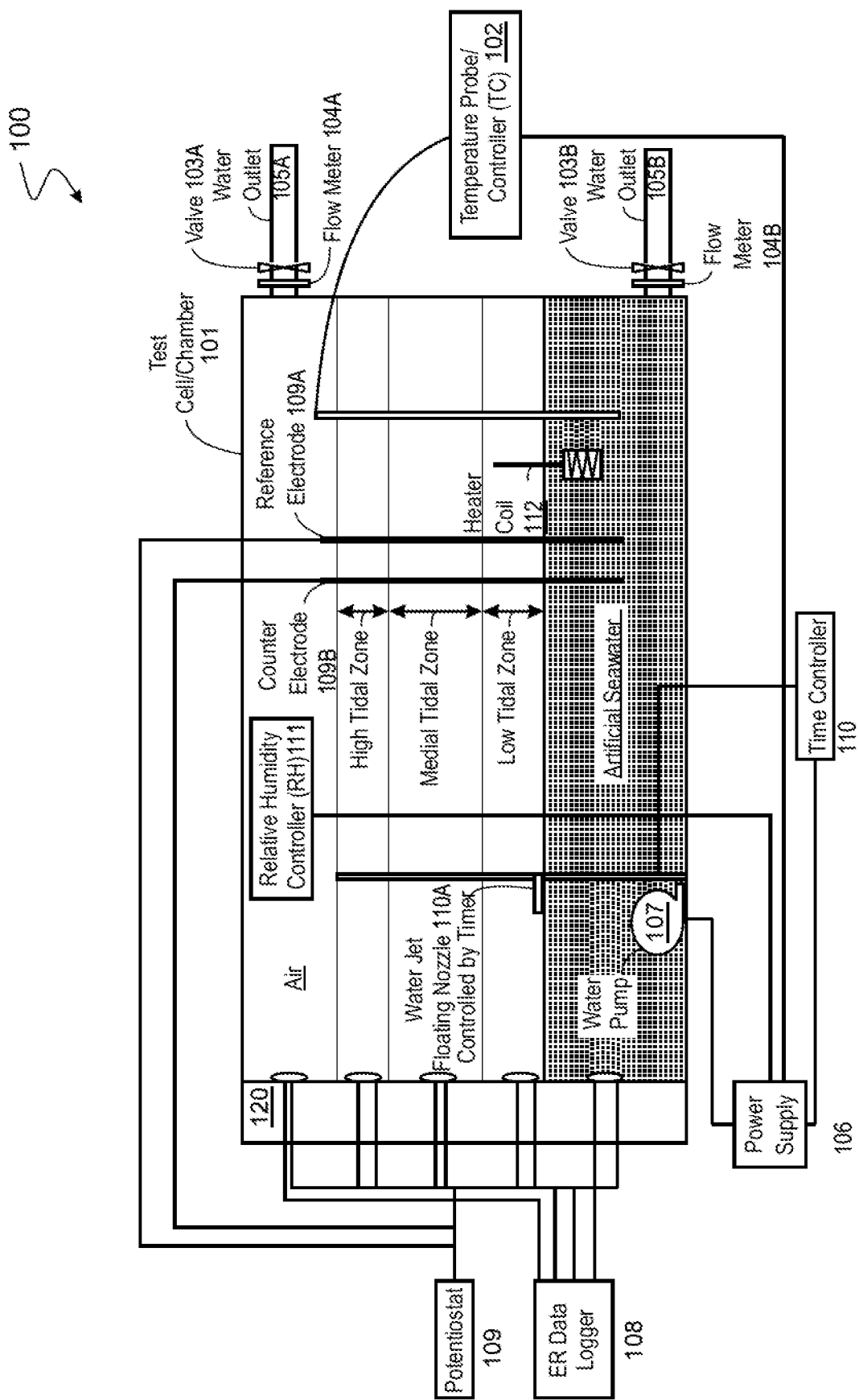
FIG. 1 illustrates an example of a laboratory apparatus, according to some implementations of the present disclosure.

FIG. 1 shows a diagram 100 illustrating an example of a laboratory apparatus according to some implementations of the present disclosure. The example laboratory apparatus includes a test cell/chamber 101 configured to simulate an offshore environment that includes a splash zone with configurable parameters. In one aspect, artificial saltwater can be introduced into test cell/chamber 101 to simulate variable levels of immersion that includes a low tidal zone, a medial tidal zone, and a high tidal zone. The implementations can control the water level using circulating water. For example, the implementations can use timer controller 110 to assert control over power supply 106, water pump 107, floating nozzles 110A, valves 103A and 103B, water outlets 105A/105B, so that water flow is systematically controlled to simulate the tides over the day. In various implementations, the amount of water injection (via floating nozzles 110A) and water outflow (e.g., via valves 103A and 103B) can be precisely controlled or monitored to achieve a desire water level/volume within the simulated environment. Here, the valves 103A and 103B are respectively coupled to flow meters 104A and 104B so that water outflow can be precisely measured. The outflow information can be provided, e.g., as feedback to time controller 110 to coordinate water inflow via nozzles 110A. In particular, the implementations can utilize water jets mounted on floating nozzles 110A to simulate the effect of the water wave by controlling the water jet using a timer provided by time controller 110. In this manner, the implementations can re-create a similar duration of the water wave in contact with a solid surface of a building structure immersed in the test cell/chamber 101. The duration can cover the various aspects of low tide and high tide to mimic actual conditions in the field. The immersed building structure can be a mock-up of an offshore structure with similar material composition and construction layout. The immersion can be partial to simulate actual field conditions. Additionally, the water jet can also be programmed to simulate waves under actual field conditions so that the impact of the waves on the building structure can also be re-created.

In another aspect, the example lab apparatus is equipped with a set of corrosion monitoring probes (e.g., electrical resistance (ER) probes) and a set of voltage probe (e.g., potentiostat 109) to monitor surface polarization. Surface polarization can refer to an electrochemical process in which a metal surface is exposed to a corrosive environment, such as the splash zone. When a metal surface is immersed in an electrolyte (such as seawater), an electrical potential can form between the metal and the electrolyte. This potential difference drives an electrochemical reaction that causes the metal to corrode. For example, the electrochemical reaction can cause a buildup of charges at the metal-electrolyte interface. The charges can create an electrical field that opposes the flow of current through the metal, effectively reducing the rate of corrosion. This process is known as surface polarization or passivation. Surface polarization can occur naturally, as the metal forms a protective oxide layer on its surface. However, in harsh environments like the splash zone, the oxide layer may not provide sufficient protection, and a more robust passivation process may be required, such as cathodic protection in which a negative potential can be applied to the metal to cause the metal to become polarized and resist further corrosion. The example of lab apparatus is equipped with ER data logger 108 that measures ER at the surface of the immersed building structure 120 while potentiostat 109 measures a voltage difference between reference electrode 109A and counter electrode 109B. The voltage difference is a voltage bias that can generate cathodic protection. In this manner, the implementations can quantify and monitor surface polarization so that the effectiveness of cathodic protection in the simulated environment can be measured. In some implementations, the ER data logger 108 can be coupled to multiple sensors (e.g., five or more ER sensors) located in different regions of the simulated environment to assess the corrosivity in each region when each region is under a respective regime of cathodic protection. The ER sensors can be made from the same metal as the metal used in offshore structure or in the splash zone area to more closely study the corrosivity and the impact of the cathodic protection in controlling corrosion. In some cases, the ER probes can also be connected to potentiostat 109 to receive voltage input for simulate surface polarization so that the effectiveness of cathodic protection can be monitored.

In yet another aspect, the air relative humidity and artificial seawater temperature can be controlled and adjusted based on, e.g., a desired range that more closely mimic the field conditions. For example, the example laboratory apparatus includes heater coil 112 and temperature probe/controller 102 so that water temperature inside test cell/chamber 101 can be monitored and adjusted. The example laboratory apparatus includes relative humidity controller (RH) 111 to adjust the humidity in the simulated environment. RH 111 may include one or more vapor sprayers to add water vapor into the simulated environment. RH 111 may include a dehumidifying module that draws warm air currents into its coils through a fan so that the warm air currents can be condensed by the refrigerated coils.

Figure 2:
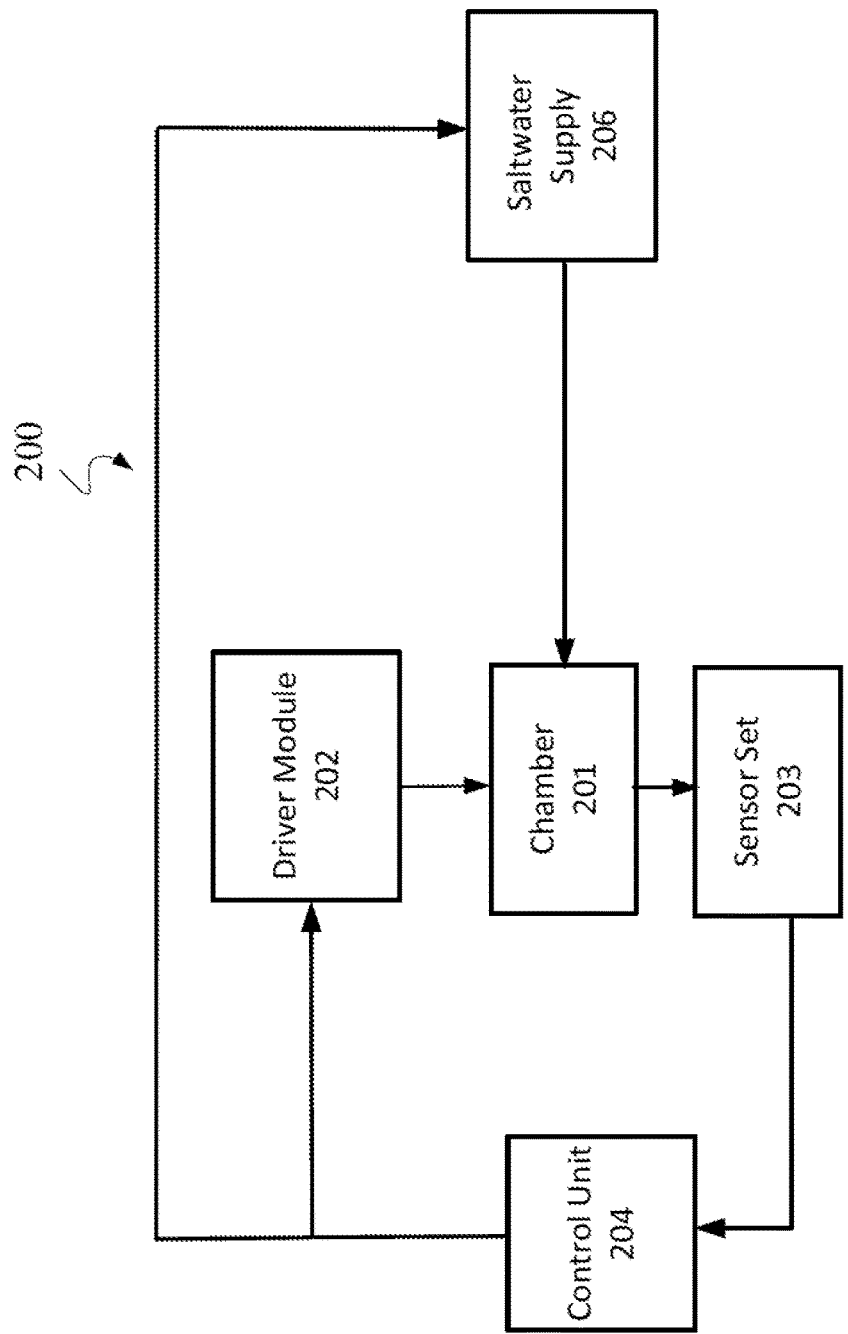
FIG. 2 is a diagram illustrating another example to simulate an offshore environment, according to some implementations of the present disclosure.

FIG. 2 shows a diagram 200 illustrating an example of a configuration according to some implementations of the present disclosure. The example configuration includes a chamber 201, a driver module 202, a sensor set 203, a control unit 204, and saltwater supply 206. Chamber 201 can be configured as a pool-like structure in which saltwater inflow can be introduced from saltwater supply 206, and saltwater outflow can be through an out-going pipe with valves. The implementations can use control unit 206 to provide timing control on saltwater inflow and outflow so that the water level in chamber 201 can alternate between several distinct levels to simulate tidal water (e.g., low tide, medial tide, high tide) on a day-by-day basis. Both the inflow and the outflow can be coupled to a flow meter so that the rate and volume of flow can be monitored. A mock building structure can be constructed or erected inside chamber 201 so that the mock building structure can be immersed in saltwater to experience the alternating water levels. The implementations can also re-create the effect of waves by using, for example, water jets, propellers, or pistons, to generate waves that mimic actual waves so that the impact of the waves on the building structure can be monitored. In these implementations, the wave-generating mechanism can be programmed and adjustable so that the strength of the waves can be effectively controlled. Driver module 202 may include motors that control the speed, pressure, and flow rate of the actuating components to inject water, and simulate waves. For example, the nozzles on the water jet and pressure inside the pipe feeding the nozzles can be controlled to achieve a desired impact on the mock building structure in the simulated environment.

Sensor set 203 can include resistance probes, voltage probes, temperature probes, humidity probes, and salinity probes. Using resistance probes and voltage probes, the control unit can monitor surface polarization on a metal surface inside the splash zone created by rising/receding water levels at a mock building structure component located inside chamber 201. In some implementations, cathodic protection may be simulated on the mock building structure component using, for example, a voltage bias. In these implementations, the effect of the cathodic protection on a mock building structure component can be monitored in-situ. The implementations can utilize control unit 204 to, for example, simulate an intended cathodic protection regime, which may include a voltage bias with a spatial aspect (spatially dependent) and a temporal aspect (e.g., varying with respect to time). For example, the implementations can apply a programmed application of voltage biases to simulate the intended cathodic protection regime. The programmed application can induce a pattern of voltage bias with a temporal and a spatial variability. Using the programmability of the voltage biases and the ability of in-situ electrical resistance mapping, the implementations can study a variety of cathodic protection regimes by, for example, comparing and contrasting the effectiveness of different cathodic protection regimes. The implementations can also investigate the effectiveness of other corrosion control measures such coatings or corrosion resistance alloys (CRA). The implementations can position multiple electrical resistance (ER) probes in various locations on the mock building structure so that the spatial pattern of corrosion can be monitored.

Sensor set 203 may further include humidity sensors to monitor the humidity level inside chamber 201. The implementations can provide a range of humidity levels in the simulated environment that mimic actual field conditions. Moreover, sensor set 203 may include temperature meters (e.g., thermostats) to monitor, for example, the temperature distribution in the simulated environment. In some implementations, the temperature meters are used in conjunction with heater coils, ultraviolet (UV) lamps, and similar elements to simulate exposure to sun light.

Figure 3:
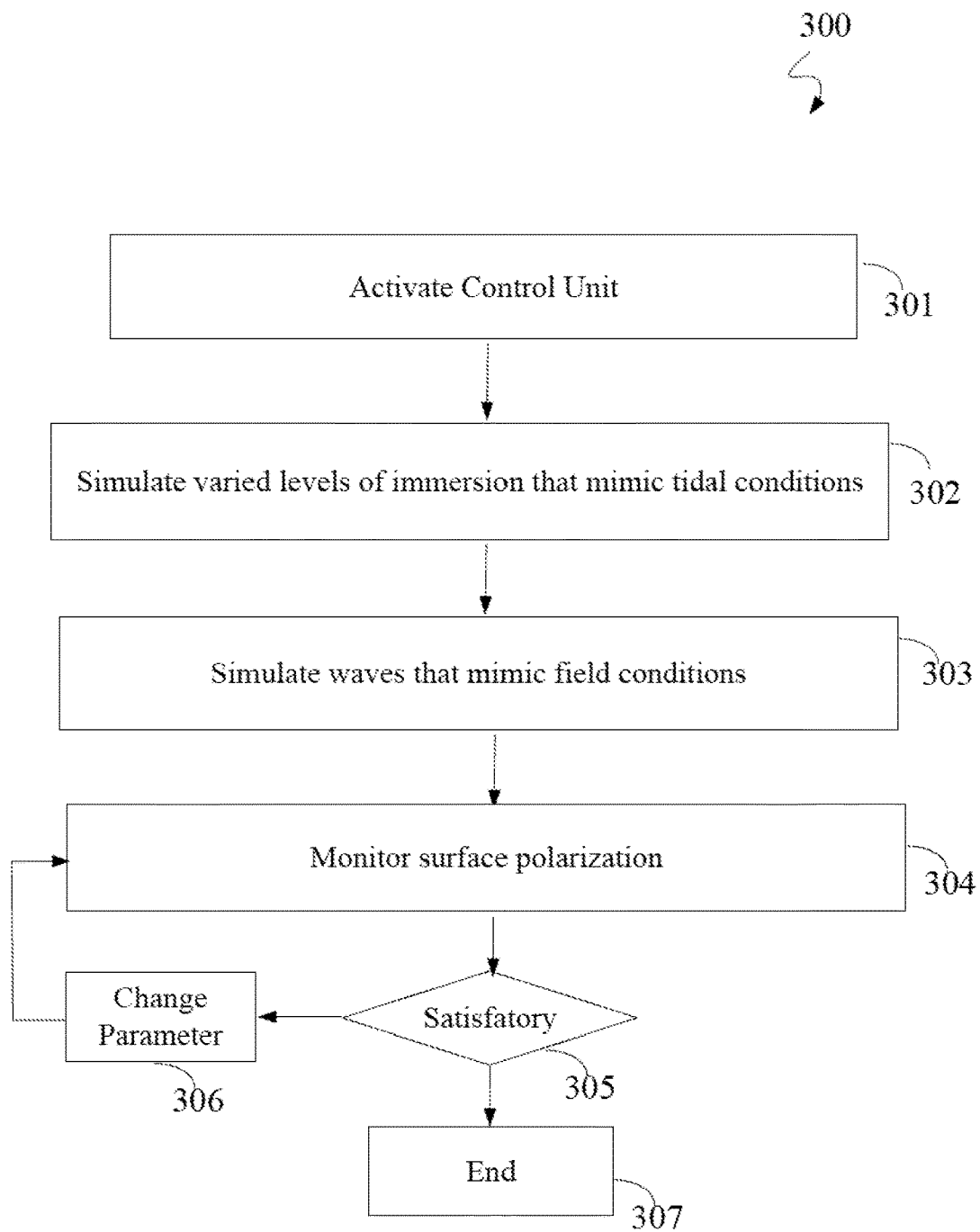
FIG. 3 is a flow chart illustrating an example of a process, according to some implementations of the present disclosure.

FIG. 3 is a flow chart 300 illustrating an example of a process, according to some implementations of the present disclosure. The process may active a control unit (301) to assert control over a chamber that simulates a splash zone in an offshore environment. As described above in association with FIGS. 1-2, an example of a chamber can include a control unit that dynamically controls saltwater level so that a tidal alteration between a low tide and a high tide is re-created on an erected mock building structure in the chamber. The control unit can apply control over the inflow and outflow of saltwater to achieve the desired saltwater level (including the alternation) inside the chamber. The dynamic control can include repetitive and cyclic control on a daily basis to simulate the varied levels of immersion of the mock building structure that mimic tidal conditions in the field (302). This cycled alternation can re-generate the splash zone condition in an offshore environment so that the effect of the splash zone on a building structure (e.g., an offshore rig structure) can be studied in a controlled environment. In some cases, the cycle of tidal waters can be hastened to multiple cycles per day so that the effect can be seen on an accelerated scale.

The process may then simulate waves in the controlled environment that mimic field conditions (303). For example, the implementations may assert control over wave-generating mechanisms (such as water jets, propellers, and pistons) so that waves can be simulated in the controlled environment, and hence the effect of the waves on the building structure in the splash zone can be studied longitudinally. In some cases, the control unit may assert control over the nozzles on the water jet and pressure inside the pipe feeding the water jet. The control unit may also program a motor that drives the propellers or pistons. By controlling the speed, pressure, and flow rate, the conditions of the waves in the splash zone can be created to mimic the field conditions.

The process may then monitor surface polarization (304). For example, the implementations may strategically position multiple (e.g., five or more) ER probes on the erected mock build structure with metal components. The ER probes can map the resistivity spatially and then infer the spatial distribution of corrosion. In other words, the spatial variation of corrosion with respect to variable such as incident wave and saltwater levels can be measured and quantified. In some cases the spatial distribution of corrosion can be created on an accelerated pace compared to an offshore environment. The implementations may also install one or more potentiostat to measure voltage distribution between a reference electrode and a counter electrode placed in the controlled environment. The potentiostat may thus measure the voltage bias being applied in some settings, e.g., as a part of a cathodic protection mechanism. The voltage bias can be dynamic in the sense that the implementations may adjust the voltage bias to, e.g., mimic a desired a cathodic protection regime.

The process may then compare the measured patterns of surface polarization with benchmarks to determine whether the erosion pattern is satisfactory (305). In some implementations, the comparison can be conducted against a pre-established level. In other implementations, the comparison can be conducted with a known reference (e.g., a known cathodic protection regime with a given voltage bias). In still other implementations, the comparison can be conducted against a common exposure (e.g., the tidal conditions and the wave conditions in combination). In response to determining that the resulting corrosion pattern is satisfactory, the process may terminate (307). In response to determining the resulting corrosion pattern is not satisfactory, the implementations may adjust a parameter (306). For example, the implementations may adjust a wave condition, a tidal condition, or a voltage bias, and then resume monitoring the surface polarization (304).

Figure 4:
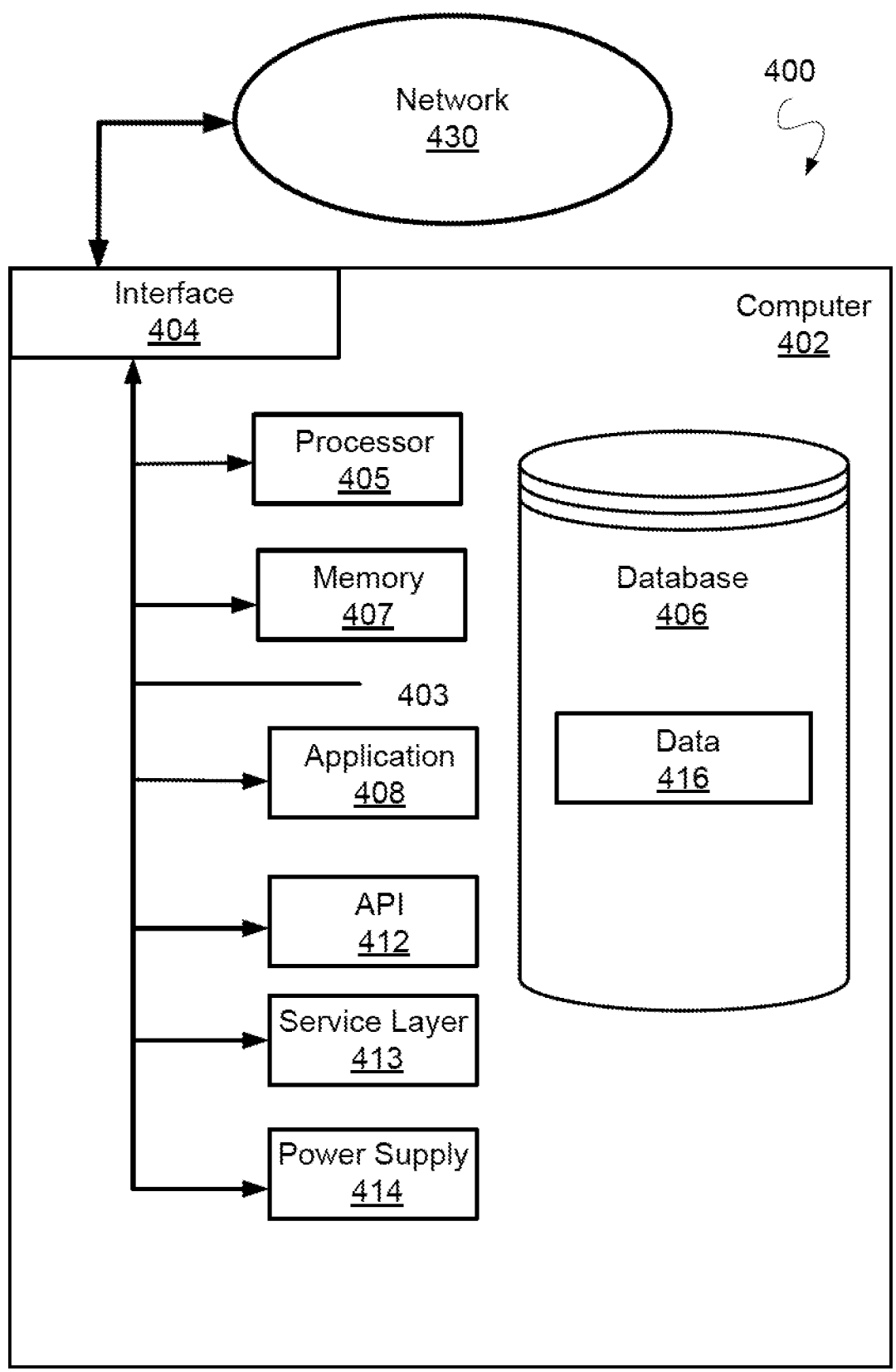
FIG. 4 is a block diagram illustrating an example of a computer system used to provide computational functionalities associated with described algorithms, methods, functions, processes, flows, and procedures, according to some implementations of the present disclosure.

FIG. 4 is a block diagram 400 illustrating an example of a computer system 400 used to provide computational functionalities associated with described algorithms, methods, functions, processes, flows, and procedures, according to some implementations of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computing device that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds data 416 including, measurements received from ER probes, one or more potentiostat and one or more thermostat, as well as control logic asserted to generate tidal conditions and wave conditions, as explained in more detail in association with FIGS. 1-3.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperable coupled with a hardware processor configured to perform the computer-implemented method or the instructions stored on the non-transitory, computer-readable medium.

What is claimed is:

1. A computer-implemented method comprising:
   activating a control unit coupled to a chamber in which a laboratory environment is being created to include at least one splash zone as seen by an offshore building, wherein a laboratory environment accommodates a mock structure having construction characteristics of the offshore building;
   operating, by the control unit, a saltwater supply and a water outlet to act in tandem to create, in the laboratory environment, the at least one splash zone that immerses, at least in part, the mock structure, at varied levels of immersion in the splash zone;
   operating, by the control unit, one or more wave-generating mechanisms to generate, in the at least one splash zone, waves that impact the mock structure, wherein the generated waves mimic actual waves that impact the offshore building;
   monitoring, by the control unit, a spatial pattern of surface polarization inside the splash zone when a cathodic protection regime has been applied, wherein the spatial pattern is determined based on electrical resistance (ER) measurements collected from a set of ER probes positioned at respective locations on the mock structure; and
   comparing, by the control unit, the spatial pattern of surface polarization with a benchmark such that an effectiveness of the cathodic protection regime is determined.

2. The computer-implemented method of claim 1, wherein comparing the spatial pattern of surface polarization with a benchmark comprises:
   comparing the spatial pattern of surface polarization resulting from the cathodic protection regime with a spatial pattern of surface polarization resulting from a different cathodic protection regime.

3. The computer-implemented method of claim 1, wherein comparing the spatial pattern of surface polarization with a benchmark comprises:
comparing the spatial pattern of surface polarization with a pre-determined level.

4. The computer-implemented method of claim 1, wherein comparing the spatial pattern of surface polarization with a benchmark comprises:
comparing the spatial pattern of surface polarization with a spatial pattern of surface polarization resulting from a known combination of tidal conditions and wave conditions.

5. The computer-implemented method of claim 1, further comprising:
in response to determining that the spatial pattern of surface polarization is not satisfactory, changing at least one parameter in the lab environment, wherein the at least one parameter includes: a parameter for generating the at least one splash zone, a parameter for generating the waves, and a parameter of a cathodic protection regime.

6. The computer-implemented method of claim 1, further comprising:
measuring, using a potentiostat, a voltage bias associated with the cathodic protection regime.

7. The computer-implemented method of claim 1, wherein generating waves that impact the mock structure in the splash zone comprises:
adjusting, using the control unit, a parameter associated with at least one water jet, wherein the parameter comprises: a speed of exiting fluid, a pressure of exiting fluid, and a flow rate of exiting fluid.

8. The computer-implemented method of claim 1, wherein generating the at least one splash zone comprises:
creating the varied levels of immersion that cyclically includes a high-tide level, a medial tide level, and a low-tide level.

9. The computer-implemented method of claim 1, wherein the varied levels of immersion are cyclically created on a daily basis.

10. The computer-implemented method of claim 1, further comprising:
heating, using a heating coil, saltwater in the chamber; and
measuring, using a thermostat, a temperature of saltwater in the chamber.

11. A computer system comprising one or more computer processors mounted on a control unit and configured to perform operations of:
activating the control unit coupled to a chamber in which a laboratory environment is being created to include at least one splash zone as seen by an offshore building, wherein a laboratory environment accommodates a mock structure having construction characteristics of the offshore building;
operating, by the control unit, a saltwater supply and a water outlet to act in tandem to create, in the laboratory environment, the at least one splash zone that immerses, at least in part, the mock structure, at varied levels of immersion in the splash zone;
operating, by the control unit, one or more wave-generating mechanisms to generate, in the at least one splash zone, waves that impact the mock structure, wherein the generated waves mimic actual waves that impact the offshore building;
monitoring, by the control unit, a spatial pattern of surface polarization inside the splash zone when a cathodic protection regime has been applied, wherein the spatial pattern is determined based on electrical resistance (ER) measurements collected from a set of ER probes positioned at respective locations on the mock structure; and
comparing, by the control unit, the spatial pattern of surface polarization with a benchmark such that an effectiveness of the cathodic protection regime is determined.

12. The computer system of claim 11, wherein comparing the spatial pattern of surface polarization with a benchmark comprises:
comparing the spatial pattern of surface polarization resulting from the cathodic protection regime with a spatial pattern of surface polarization resulting from a different cathodic protection regime.

13. The computer system of claim 11, wherein comparing the spatial pattern of surface polarization with a benchmark comprises:
comparing the spatial pattern of surface polarization with a pre-determined level.

14. The computer system of claim 11, wherein comparing the spatial pattern of surface polarization with a benchmark comprises:
comparing the spatial pattern of surface polarization with a spatial pattern of surface polarization resulting from a known combination of tidal conditions and wave conditions.

15. The computer system of claim 11, wherein the operations further comprise:
in response to determining that the spatial pattern of surface polarization is not satisfactory, changing at least one parameter in the lab environment, wherein the at least one parameter includes: a parameter for generating the at least one splash zone, a parameter for generating the waves, and a parameter of a cathodic protection regime.

16. The computer system of claim 11, wherein the operations further comprise:
measuring, using a potentiostat, a voltage bias associated with the cathodic protection regime.

17. The computer system of claim 11, wherein generating waves that impact the mock structure in the splash zone comprises:
adjusting, using the control unit, a parameter associated with at least one water jet, wherein the parameter comprises: a speed of exiting fluid, a pressure of exiting fluid, and a flow rate of exiting fluid.

18. The computer system of claim 11, wherein generating the at least one splash zone comprises:
creating the varied levels of immersion that cyclically includes a high-tide level, a medial tide level, and a low-tide level.

19. The computer system of claim 11, wherein the varied levels of immersion are cyclically created on a daily basis.

20. The computer system of claim 11, further comprising:
heating, using a heating coil, saltwater in the chamber; and
measuring, using a thermostat, a temperature of saltwater in the chamber.

* * * * *